(12) United States Patent
Uzumcu et al.

(10) Patent No.: US 7,077,736 B2
(45) Date of Patent: Jul. 18, 2006

(54) ANGLE ATTACHMENT FOR POWER TOOL

(75) Inventors: Al Uzumcu, Vernon Hills, IL (US); Scott Adler, Madison, IL (US); Brian Albrecht, Baraboo, WI (US); Timothy D. Baker, Roselle, IL (US)

(73) Assignee: Credo Technology Corporation, Broadview, IL (US)

( * ) Notice: Subject to any disclaimer, the term of this patent is extended or adjusted under 35 U.S.C. 154(b) by 52 days.

(21) Appl. No.: 10/791,671

(22) Filed: Mar. 2, 2004
(Under 37 CFR 1.47)

(65) Prior Publication Data
US 2005/0009458 A1    Jan. 13, 2005

Related U.S. Application Data

(60) Provisional application No. 60/451,566, filed on Mar. 3, 2003.

(51) Int. Cl.
B24B 23/00    (2006.01)

(52) U.S. Cl. ..................... 451/359; 451/358
(58) Field of Classification Search .......... 451/359, 451/358, 357, 524, 557; 144/136.95
See application file for complete search history.

(56) References Cited

U.S. PATENT DOCUMENTS

| | | | |
|---|---|---|---|
| 1,806,582 A | 5/1931 | Beutner | |
| 2,179,724 A | 11/1939 | Kuehne | |
| 2,517,910 A | 8/1950 | Miller | |
| 2,553,688 A | 5/1951 | Thompson | |
| 3,574,374 A | 4/1971 | Keller et al. | |
| 3,597,883 A | 8/1971 | Choplin et al. | |
| 3,901,098 A | 8/1975 | Jinkins | |
| 4,060,940 A | 12/1977 | DeWitt | |
| 5,005,321 A | 4/1991 | Barth et al. | |
| 5,052,496 A | 10/1991 | Albert et al. | |
| 5,201,146 A | 4/1993 | Fushiya | |
| 5,595,250 A | 1/1997 | Bourke | |
| 5,601,483 A | 2/1997 | Rudolf et al. | |
| 5,718,621 A | 2/1998 | Turley | |
| 5,813,805 A | 9/1998 | Kopras | |
| 5,863,159 A | 1/1999 | Lasko | |
| 5,902,080 A | 5/1999 | Kopras | |
| 6,048,260 A * | 4/2000 | Kopras | ........... 451/358 |
| 6,089,331 A | 7/2000 | Christ | |

(Continued)

FOREIGN PATENT DOCUMENTS

DE    947 270    8/1956

(Continued)

OTHER PUBLICATIONS

European Search Report; Application No. EP 04 00 4889; date of completion Jun. 28, 2004; 2 pgs.

*Primary Examiner*—Lee D. Wilson
(74) *Attorney, Agent, or Firm*—Foley & Lardner LLP

(57) ABSTRACT

An angle attachment for a rotary power tool includes a first assembly including a first shaft and a first gear and a second assembly including a second shaft and a second gear. The second gear engages the first gear and the central longitudinal axis of the second shaft is not collinear or parallel to the central longitudinal axis of the first shaft. The angle attachment further includes a member configured for removable coupling to a motor shaft of a rotary power tool and for removable coupling with the first assembly. At least a portion of the member is configured for insertion into a component of the first assembly.

37 Claims, 16 Drawing Sheets

U.S. PATENT DOCUMENTS

| | | | |
|---|---|---|---|
| 6,120,362 A * | 9/2000 | Etter et al. ............... 451/354 |
| 6,153,838 A | 11/2000 | Wadge |
| 6,170,579 B1 | 1/2001 | Wadge |
| 6,176,322 B1 | 1/2001 | Wadge |
| 6,206,107 B1 | 3/2001 | Wadge |
| 6,263,980 B1 | 7/2001 | Wadge |
| 6,286,611 B1 | 9/2001 | Bone |
| 6,306,024 B1 * | 10/2001 | Kai et al. ............... 451/357 |
| 6,352,127 B1 | 3/2002 | Yorde |
| 2005/0009458 A1 * | 1/2005 | Uzumcu et al. ............ 451/359 |

FOREIGN PATENT DOCUMENTS

| | | |
|---|---|---|
| DE | 2 300 120 | 7/1974 |
| DE | 32 12021 A1 | 10/1982 |
| DE | 43 26 652 A1 | 1/1994 |
| EP | 0 405 132 B1 | 1/1991 |
| EP | 1 129 825 A2 | 9/2001 |

* cited by examiner

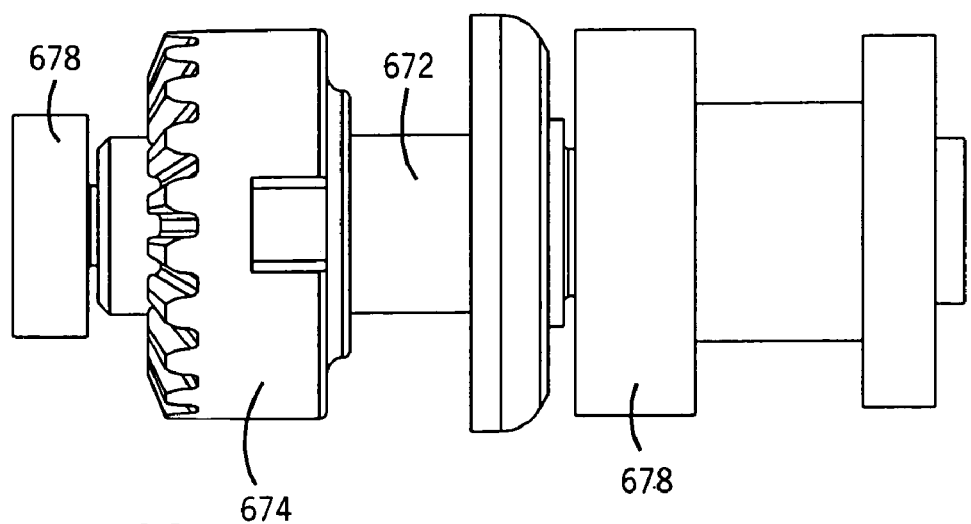
FIG. 22
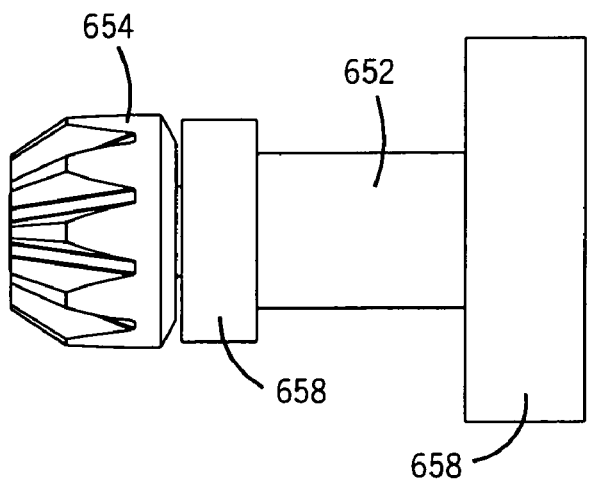
FIG. 23
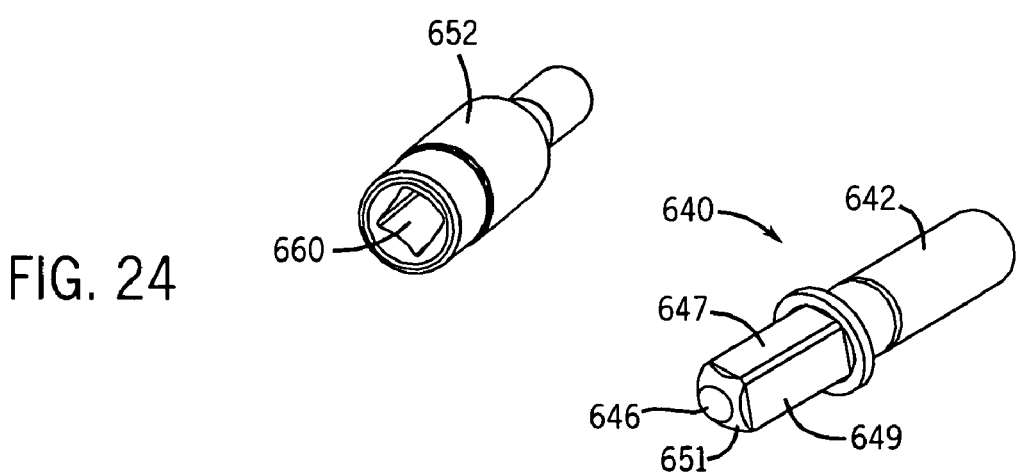
FIG. 24
FIG. 25

ANGLE ATTACHMENT FOR POWER TOOL

CROSS-REFERENCE TO RELATED APPLICATIONS

This application claims the benefit under 35 U.S.C. §119(e) of U.S. Provisional Patent Application No. 60/451,566, filed Mar. 3, 2003, which is incorporated herein by reference in its entirety.

FIELD

The present inventions relate generally to hand-held power tools such as rotary cutting tools. More particularly, the present inventions relate to angle attachments for such power tools.

BACKGROUND

It is known to provide a variety of attachments for power tools such as rotary cutout or cutting tools. It is further known to provide angle attachments for such power tools. Such known attachments do not realize certain advantageous features and/or combinations of features as described herein.

Rotary cutout or cutting tools are hand-held power tools having an electric motor that rotates a cutting tool bit at very high speeds. The motor drives a motor shaft which extends from one end of a motor housing along the central longitudinal axis thereof. A mechanical structure, such as a conventional drill-type chuck or a collet-type system, is mounted on the end of the motor shaft outside of the motor housing, for attaching cutting tool bits and other accessories or attachments to the motor shaft.

The cutting tool bits are configured to form cuts in a workpiece in a direction substantially parallel and perpendicular to the central longitudinal axis (e.g., the axis of rotation) of the bit. In this manner, the cutting tool may be used to remove material from a workpiece by moving the rotating cutting tool bit through the workpiece in a direction perpendicular to the axis of rotation of the bit. Thus, a cutting tool is conventionally operated by grasping the motor housing with one or both hands, and/or grasping a handle attached to the motor housing, turning on the electric motor to begin high speed rotation of the cutting tool bit, plunging the spinning cutting tool bit into a work piece, such as a piece of wood, and then moving the cutting tool bit through the workpiece in a direction perpendicular to the axis of the spiral cutting tool bit by moving the motor housing in a direction parallel to the plane of the workpiece surface while keeping the axis of the motor housing substantially perpendicular to the workpiece surface.

The utility of a cutting tool may be enhanced by attaching accessories other than cutting tool bits to the motor shaft. For example, a cutting wheel or sanding disk might be attached to the cutting tool motor shaft to be driven by the high-speed cutting tool motor. The use of such attachments expand the utility of the cutting tool to various other cutting and sanding operations. However, the utility of such attachments may be limited if they are attached directly to the end of the motor shaft. In such a case, the orientation of the attachment with respect to the motor housing may inhibit effective use of the cutting tool due to limited control and visibility.

Some conventional angle attachments for use with power tools require that a portion of the internal drive mechanism for the angle attachment be removed from the attachment to couple the attachment to a power tool. For example, a shaft having a gear coupled thereto is removed from the angle attachment and coupled to a motor shaft (e.g., using a chuck or collet assembly), after which the shaft and gear are inserted into the attachment to couple the attachment to the power tool. Such an arrangement may result in misalignment of internal components of the attachment (e.g., the gear may not be precisely aligned with another gear in the attachment), which may cause wear or other damage to components of the attachment.

A related difficulty with conventional angle attachments is that precise coupling between the various components is required. For example, slight misalignments between gears or other components may result in inoperability and/or damage to the attachment and/or power tool. Such misalignment may result in part from the act of coupling the attachment to the power tool.

Accordingly, it would be advantageous to provide an attachment or accessory for a cutting tool or other hand-held power tool that allows cutting wheels, sanding disks, grinding wheels, polishing pads, and similar attachments to be coupled to the cutting tool motor in a useful orientation with respect to the cutting tool motor housing. It would also be advantageous to provide an attachment that allows for connection to a power tool without the need to remove internal components of the attachment.

SUMMARY

An exemplary embodiment relates to an angle attachment for a rotary power tool. The angle attachment includes a first assembly including a first shaft and a first gear, the first shaft having a central longitudinal axis. The angle attachment also includes a second assembly including a second shaft and a second gear, wherein the second gear engages the first gear and the second shaft has a central longitudinal axis, wherein the central longitudinal axis of the second shaft is not collinear or parallel to the central longitudinal axis of the first shaft. The angle attachment further includes a member configured for removable coupling to a motor shaft of a rotary power tool and for removable coupling with the first assembly. At least a portion of the member is configured for insertion into a component of the first assembly.

Another exemplary embodiment relates to an attachment for a rotary power tool. The attachment comprises a first assembly comprising a first gear coupled to a first shaft and a second assembly comprising a second gear coupled to a second shaft, the second gear intermeshing with the first gear. A component of the first assembly includes an aperture for receiving therein at least a portion of a connector configured for removable coupling between a motor shaft of a rotary power tool and the component. The attachment is configured to translate rotation of the first shaft to rotation of the second shaft, the first and second shafts each having axes of rotation and oriented such that the axis of rotation of the first shaft is neither parallel nor collinear with the axis of rotation of the second shaft.

Another exemplary embodiment relates to an angle attachment for a rotary power tool. The angle attachment includes a first assembly comprising a first gear provided on a first shaft and a second assembly comprising a second gear intermeshing with the first gear and provided on a second shaft. The first shaft and second shaft are arranged such that they are not parallel or collinear with each other. The angle attachment further includes a member for removable coupling to the first assembly and to a drive shaft of a rotary power tool. The first shaft includes an aperture for receiving therein a portion of the member.

Another exemplary embodiment relates to a connector for coupling a rotary power tool to an attachment for the rotary power tool. The connector includes a shaft having a central longitudinal axis, the shaft configured for coupling to a drive shaft of a rotary power tool. The connector also includes a head portion having a plurality of surfaces, at least a portion the head portion having a generally polygonal cross-section transverse to the central longitudinal axis, at least one of the plurality of surfaces being convex with respect to the central longitudinal axis in the direction of the central longitudinal axis. The head portion is configured for engaging a polygonal aperture provided in a component coupled to a rotary member of the attachment.

BRIEF DESCRIPTION OF THE DRAWINGS

FIG. 22 is a plan view of a gear and bearing assembly utilized with the attachment shown in FIG. 19.

FIG. 23 is a plan view of another gear and bearing assembly used with the attachment shown in FIG. 19.

FIG. 24 is a perspective view of a portion of the gear and bearing assembly shown in FIG. 23.

FIG. 25 is a perspective view of a connector used with the attachment shown in FIG. 19.

DETAILED DESCRIPTION OF EXEMPLARY EMBODIMENTS

Figure 1:
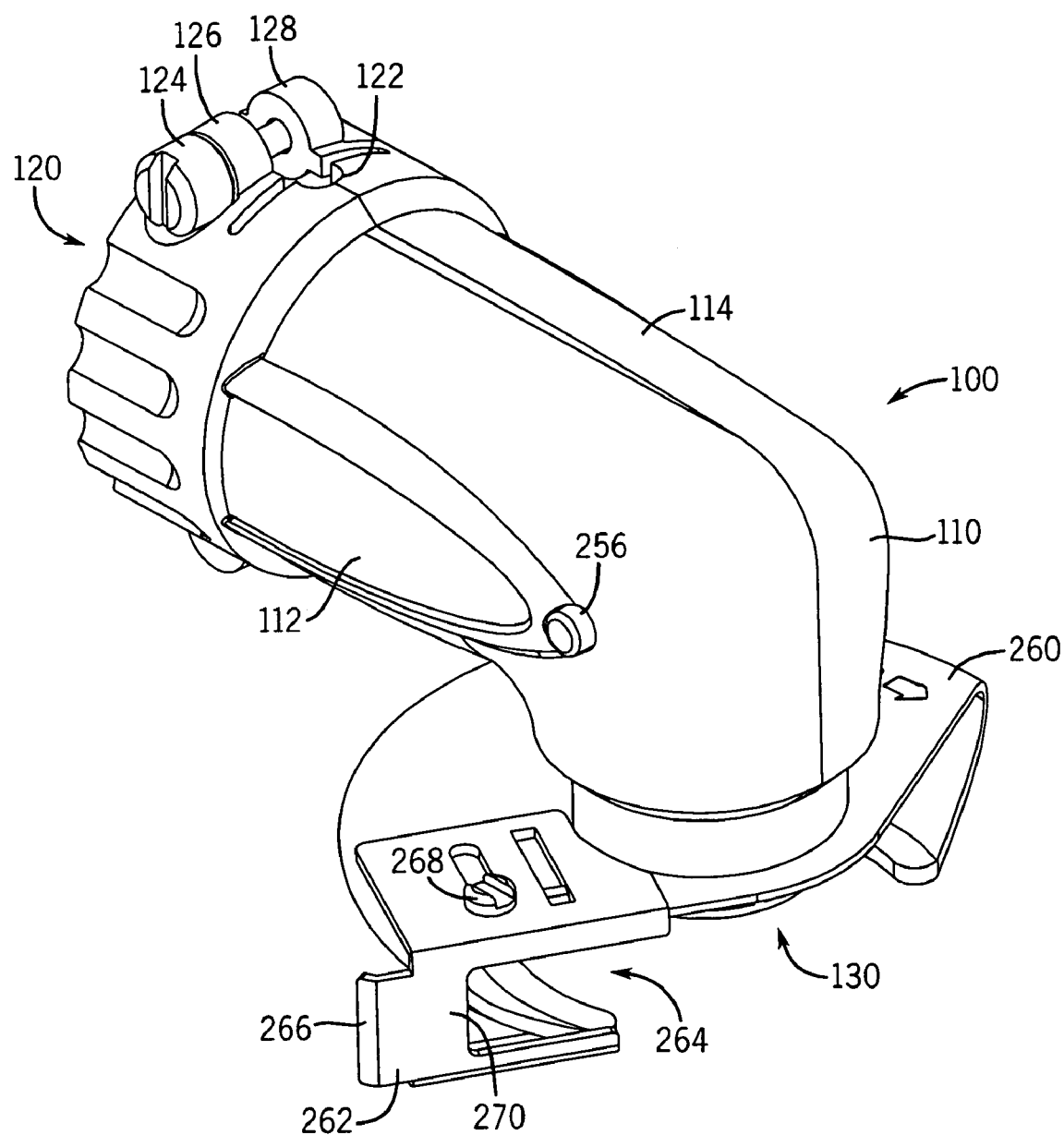
FIG. 1 is a perspective view of an attachment or accessory for a power tool according to an exemplary embodiment.

An accessory or attachment 100 (illustrated as an angle attachment) is shown in FIG. 1 in accordance with an exemplary embodiment. The attachment 100 includes an attachment housing 110, which contains and encloses various components of the attachment 100.

According to an exemplary embodiment, the attachment housing 110 is made of an electrically insulating material such as hard plastic or another polymeric material. According to other exemplary embodiments, the attachment housing may be made of other materials (e.g., metals, composite materials, etc.).

According to an exemplary embodiment, the housing 110 is formed as two complementary portions 112 and 114 that are joined or coupled together to form the complete housing 110. The two portions 112 and 114 may be coupled together using any of a variety of conventional methods (e.g., adhesives, fasteners such as screws or nut and bolt type assemblies, etc.).

Figure 5:
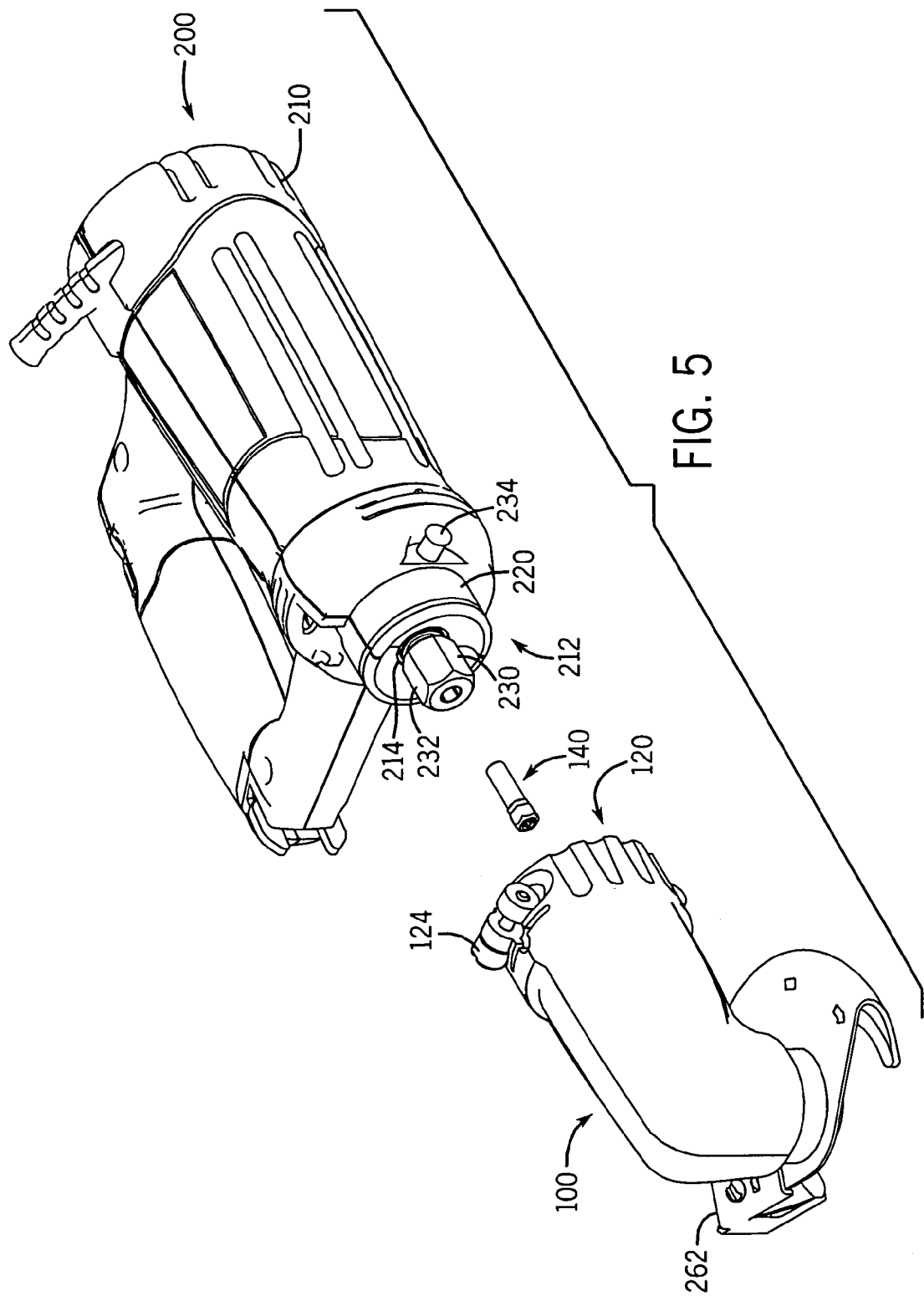
FIG. 5 is an exploded perspective view of an assembly showing the coupling of the attachment shown in FIG. 1 to a power tool according to an exemplary embodiment.
Figure 8:
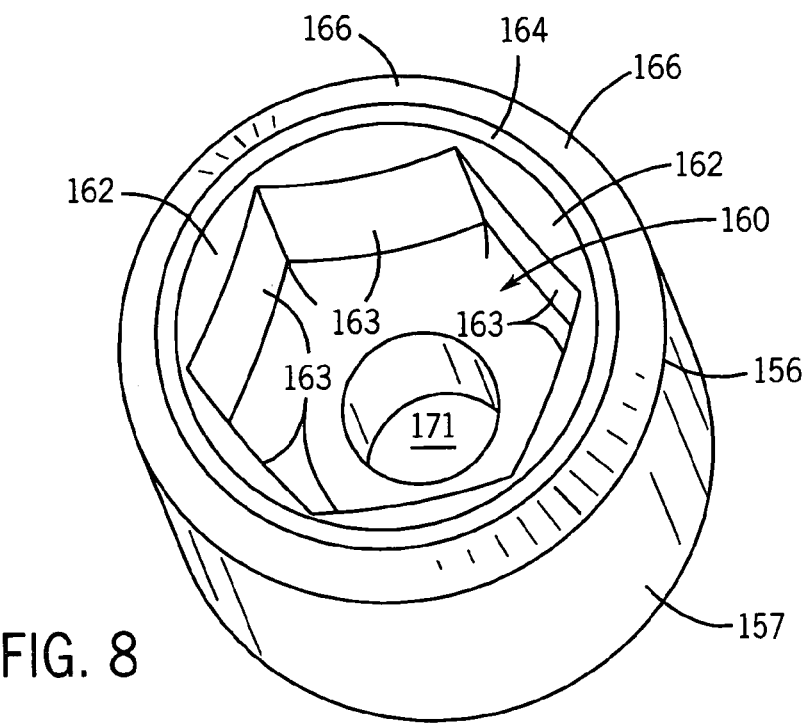
FIG. 8 is a perspective view of a connector for use with the attachment shown in FIG. 1 according to an exemplary embodiment.

The attachment housing 110 includes an open first end 120 that is adapted to couple with a housing or casing of a power tool (shown as a hand-held cutting or cutout tool in FIG. 5). FIG. 8 shows the attachment 100 coupled to a power tool 200 at a first end 212 of a power tool housing or casing 210 (e.g., around a collar 220). The open first end 120 of the attachment housing 110 is configured to receive therein the first end 212 of the power tool housing 210 around the location where a motor shaft 214 emerges from the power tool housing 210 to attach the attachment housing 110 to the power tool housing 210. It should be noted that the attachment 100 may be coupled to the power tool 200 in orientations different from that shown in the FIGURES. For example, the attachment 100 may be rotated around the axis of the power tool between 0 and 360 degrees from the orientation shown in the FIGURES.

One or more slots or openings 122 extend inward from the open first end 120 of the attachment housing 110. According to an exemplary embodiment, slots 122 are formed at two locations around the open first end 120 (e.g., opposite each other across the open end 120). The slots 122 permit the open first end 120 of the attachment housing 110 to expand and contract slightly to allow the open first end 120 of the attachment housing 110 to be mounted to the first end 212 of the power tool housing 210.

According to an exemplary embodiment, spring force created by portions of the attachment housing 110 on each side of the slots 122 acts to couple the open first end 120 of the attachment housing 110 to the power tool housing 210. According to an exemplary embodiment, one or more fasteners 124 are provided to tighten the open first end 120 of the attachment housing 110 around the first end 212 of the power tool housing 210. The fasteners 124 may be implemented as screws, bolts, or similar fasteners, and may be configured for tightening and loosening using a screwdriver (or other tool such as a wrench, etc.) and/or by hand. The fasteners 124 extend through a first extension 126 formed on the first housing portion 112 and through a second extension 128 formed on the second housing portion 114. According to an exemplary embodiment, the extensions 126 and 128 are integrally formed with the attachment housing 110. The extension 128 includes a threaded fastener hole formed therein to receive a threaded portion of a fastener 124. According to another exemplary embodiment, the positions of the extensions 128 and 126 may be reversed, such that the extension 126 is provided on the portion 114 and the extension 128 is provided on the portion 112.

As the one or more fasteners 124 are tightened, the extending portions 126 and 128 are drawn together, thereby partially closing the slots 122 to reduce the circumference of the open first end 120 of the attachment housing 110. The open end 120 of the attachment housing 1110 is thus tightened around the end of the power tool housing 210 to couple or attach the attachment housing 110 securely thereto.

Figure 2:
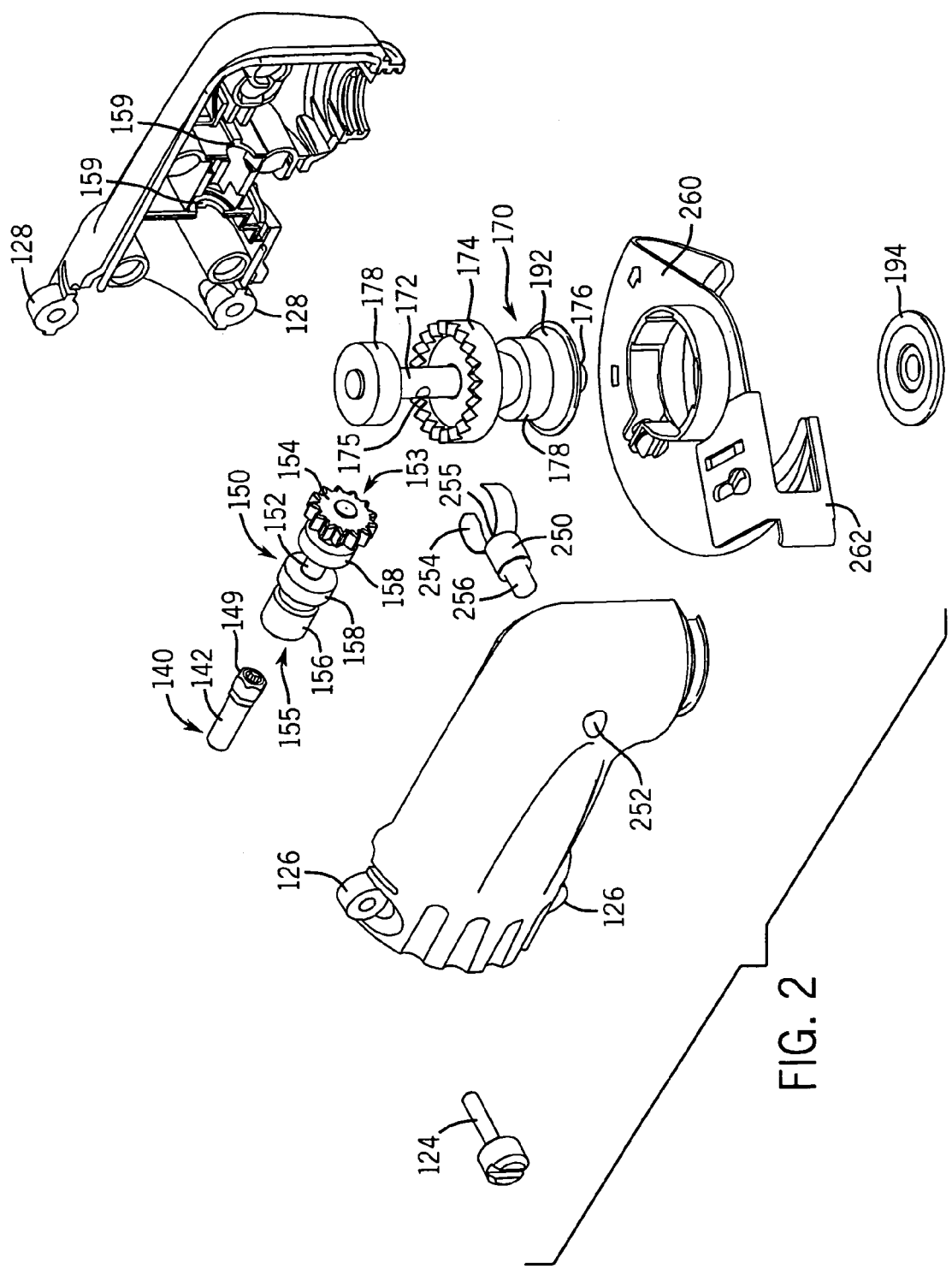
FIG. 2 is an exploded perspective view of the attachment shown in FIG. 1.
Figure 3:
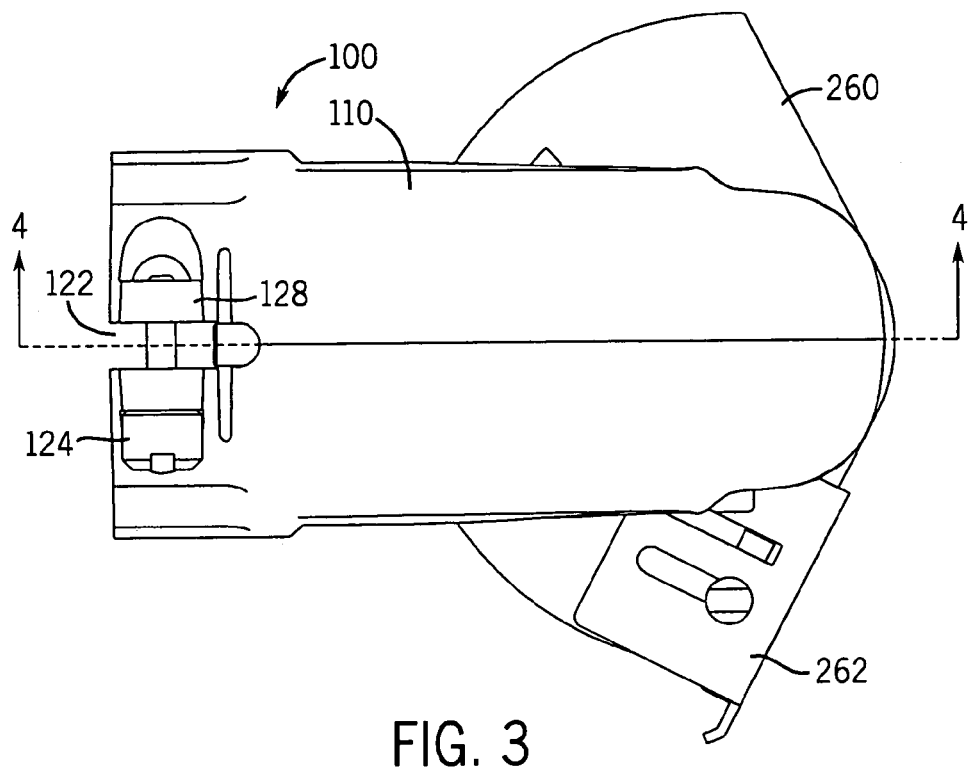
FIG. 3 is a top plan view of the attachment shown in FIG. 1.
Figure 4:
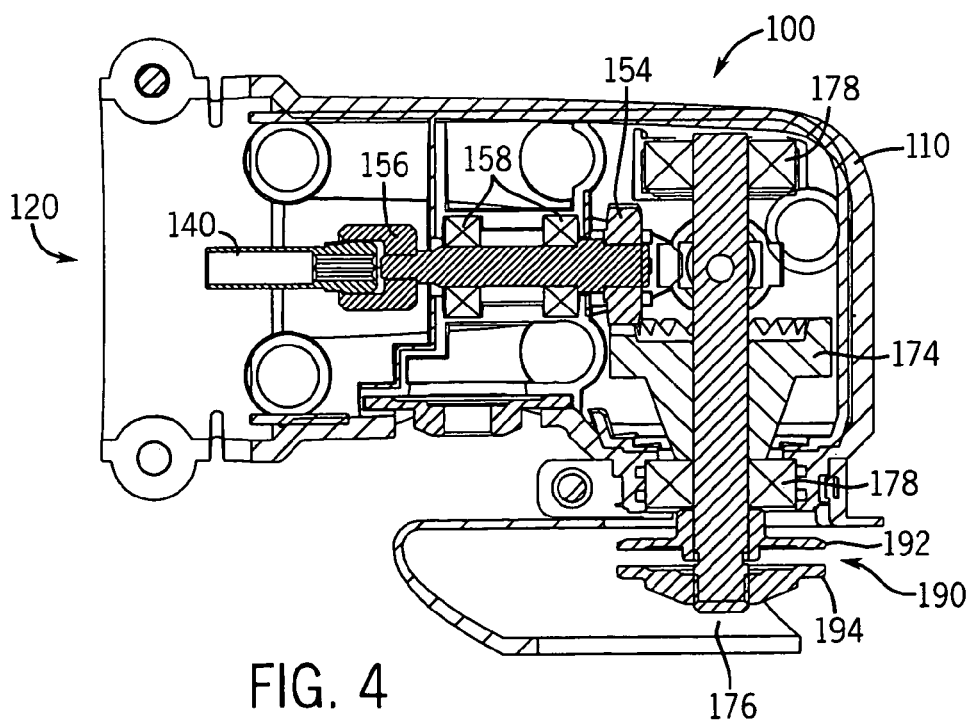
FIG. 4 is a cross-sectional view of the attachment taken along line 4—4 in FIG. 3.

As shown in FIGS. 2 and 4, an assembly 150 (e.g., a first gear and bearing assembly) is provided within the attachment housing 110. The assembly 150 includes a shaft 152 upon which a gear 154 (shown as a pinion gear) is mounted. The shaft 152 is referred to herein as a "tool coupling shaft 152" since this shaft is coupled-to a power tool when the attachment 100 is coupled to a power tool. The gear 154 is mounted to a first end 153 of the tool coupling shaft 152.

Bearings 158 are also provided on the tool coupling shaft 152 to allow relatively smooth rotation of the tool coupling shaft 152 during operation. Removal of the tool coupling shaft 152 from the attachment housing 110 when the first and second portions 112, 114 are assembled is prevented by the interaction of the bearings 158 with features or structures 159 (e.g., walls, stops, etc.) formed in the interior of the attachment housing 110. According to an exemplary embodiment, features 159 are provided in the form of walls or barriers that restrict sliding movement of the tool coupling shaft 152 in a direction parallel to its central longitudinal axis. The features 159 engage the bearings 158 when the tool coupling shaft is moved laterally along its central longitudinal axis. According to an exemplary embodiment, the features 159 are provided both in the portion 112 and in the portion 114. According to other exemplary embodiments, the features 159 are provided only in one of the portions 112 and 114.

Figure 9:
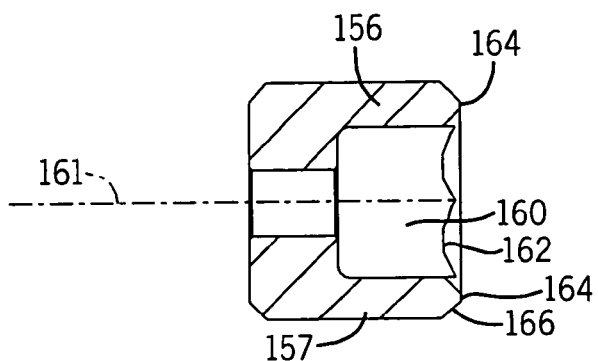
FIG. 9 is a cross-sectional view of the connector shown in FIG. 8.

A component of the assembly includes an aperture provided therein for coupling to a connector utilized to couple the attachment 100 to a power tool. According to the exemplary embodiment shown as attachment 100, the component is a connector 156 shown as a female hex-type nut or connector having an aperture or opening 160 provided therein (see, e.g., FIGS. 8–9) is coupled to a second end 155 of the tool coupling shaft 152 opposite the first end 153. Connector 156 is referred to hereinafter as "female connector 156." The second end 155 of the tool coupling shaft 152 extends at least partially into an aperture 171 formed in the female connector 156. The aperture 171 has a shape complementary to that of the tool coupling shaft 152. According to other exemplary embodiments, the component having an aperture provided therein may be a different component (e.g., the shaft 152 may have an aperture provided in an end thereof).

According to an exemplary embodiment, the aperture 160 (shown as a hexagonal opening defined by six walls 163) is provided in the female connector 156. According to other exemplary embodiments, the opening formed in the female connector may have another polygonal shape (e.g., a square, pentagon, octagon, etc.) having a different number of walls.

Figure 13:
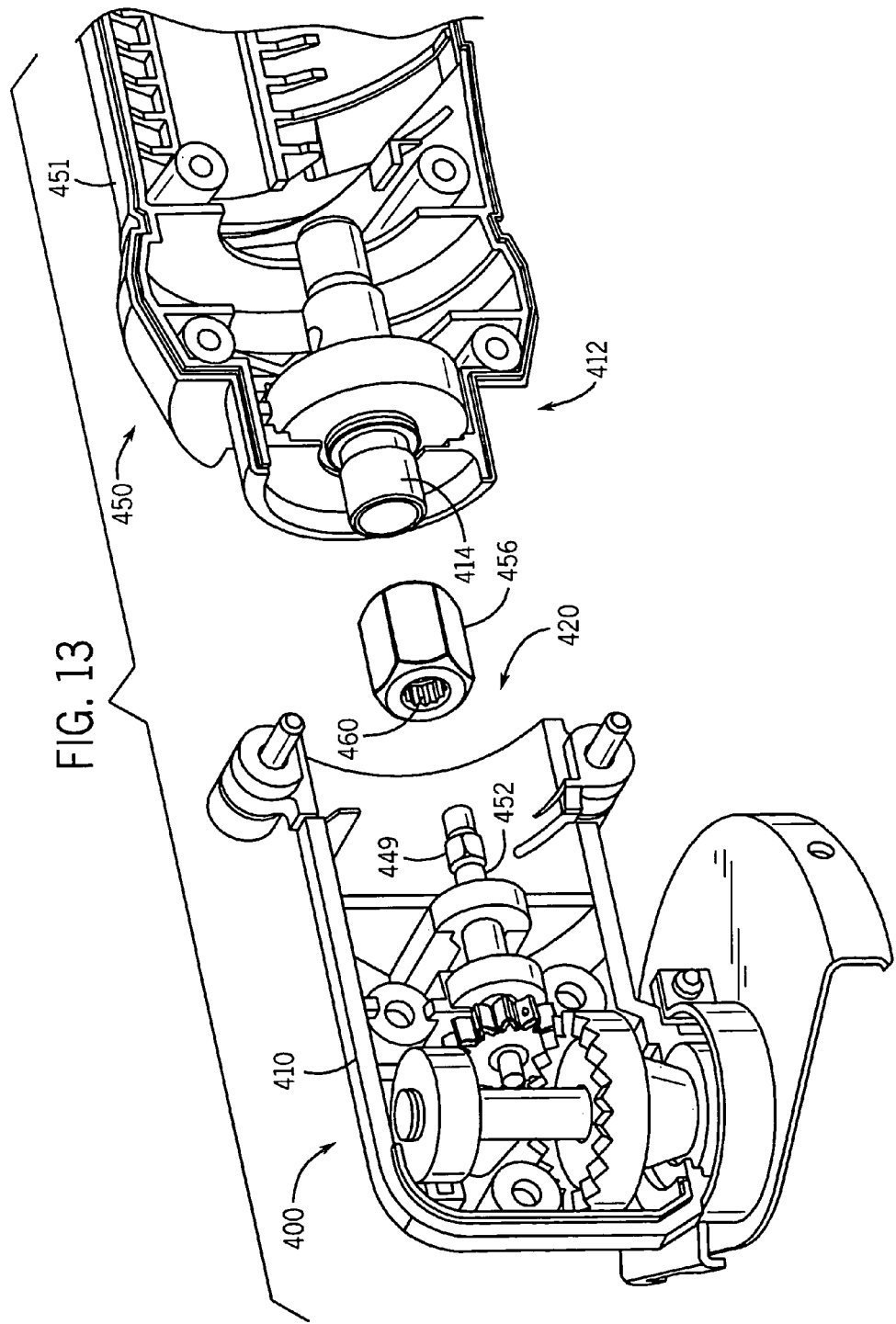
FIG. 13 is an exploded perspective cutaway view of an assembly including an attachment and a power tool according to another exemplary embodiment.
Figure 14:
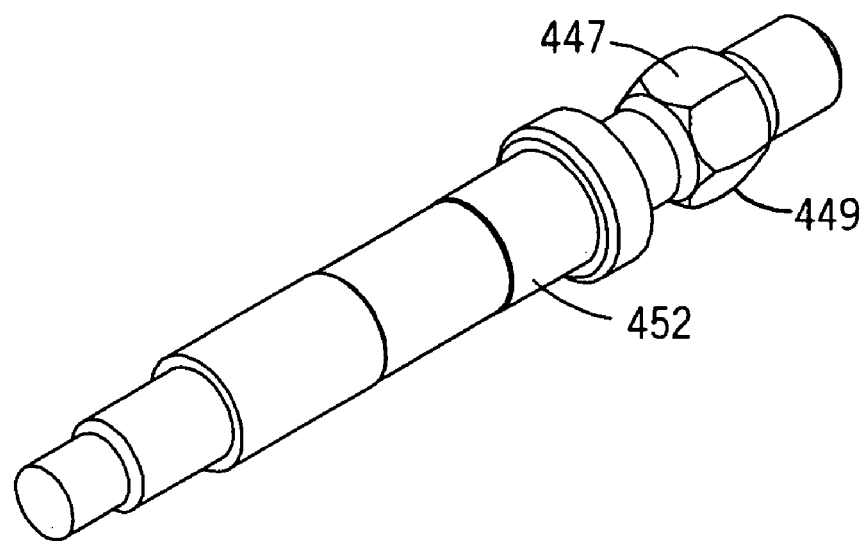
FIG. 14 is a perspective view of a gear and bearing assembly for use with the assembly shown in FIG. 13.
Figure 16:
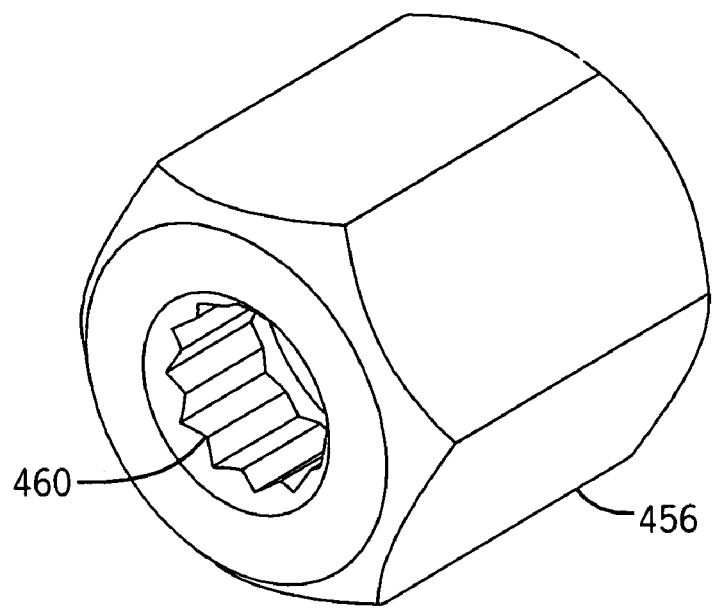
FIG. 16 is a perspective view of a connector for use with the assembly shown in FIG. 14.
Figure 17:
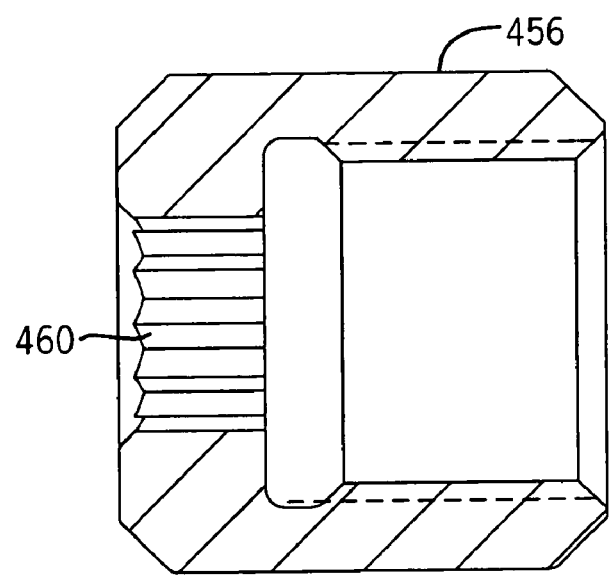
FIG. 17 is a cross-sectional view of the connector shown in FIG. 16.

According to another exemplary embodiment, the opening may have a 12-point configuration (see, e.g., FIGS. 13 and 16–17).

A rounded or chamfered surface 162 extends between the outermost edge of the aperture 160 and a front surface 164 of the female connector 156. The plane formed by the front surface 164 is arranged substantially perpendicular to the central longitudinal axis 161 (FIG. 9) of the female connector 156. A chamfered surface 166 extends between the front surface 164 and a side outer surface 157 of the female connector 156.

According to other exemplary embodiments, various other configurations may be used. For example, the chamfered surface 166 may be rounded or eliminated such that the front surface 164 and the side surface 157 are arranged at substantially right angles to each other. In another example, the front surface may be rounded to form a relatively continuous curve between the rounded surface 162 and the side surface 157. Any of a variety of configurations may be used in other exemplary embodiments, and any such configurations are intended to be included within the scope of the present disclosure.

According to an exemplary embodiment, the female connector 156 is relatively permanently attached or coupled to the tool coupling shaft 152. For example, the female connector 156 may be integrally formed with the tool coupling shaft 152 or attached thereto by welding, gluing, or other relatively permanent means. According to another exemplary embodiment, the female connector is removably coupled or attached to the tool coupling shaft (e.g., screwed on in a direction opposite the direction of rotation of the tool coupling shaft 152, etc.). For example, an aperture may be provided in the female connector that is configured to receive therein a complementary feature provided on the tool coupling shaft (or vice versa) to secure the female connector and tool coupling shaft together (e.g., the female connector may be retained from lateral movement along the axis of the shaft using one or more features formed in the attachment housing).

According to an exemplary embodiment, a member or element such as a connector 140 (referred to hereinafter as "male connector 140" and shown in the form of a crowned hex driver, see, e.g., FIGS. 2 and 10–12) is configured for coupling to a power tool to the female connector 156. The male connector 140 includes a shaft 142 and a head or forward portion 149. The shaft 142 has a size and shape configured to allow receipt of the shaft 142 within a conventional collet assembly or chuck provided on a power tool (e.g., such as power tool 200 shown in FIG. 5 having a collet assembly 230 including a collet nut 232 and a collet (not shown)). Tightening the collet or chuck against the shaft 142 acts to securely couple the male connector 140 to the motor shaft 214 of the power tool 200. While the shaft 142 is shown as having a generally cylindrical shape, other configurations for the shaft may be used. For example, according to an exemplary embodiment, the shaft may have a tapered or flared configuration, with the cross-sectional area of the shaft varying along its length. Other configurations may also be used for the shaft (e.g., having cross-sectioned shapes such as squares, hexagons, or other polygons).

Figure 18:
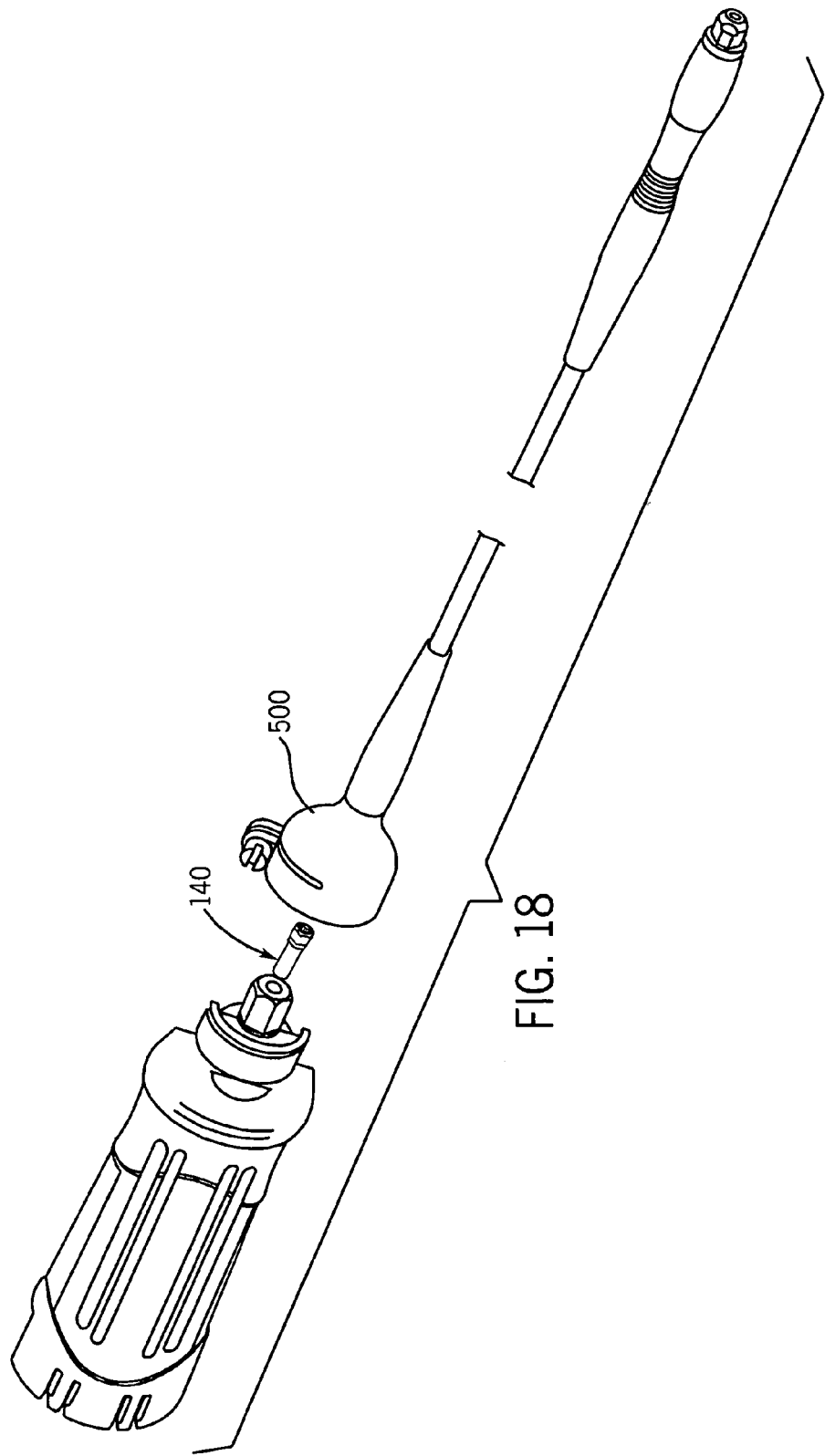
FIG. 18 is an exploded perspective view showing an assembly including a power tool, a connector, and a flexible shaft cutting tool.
Figure 19:
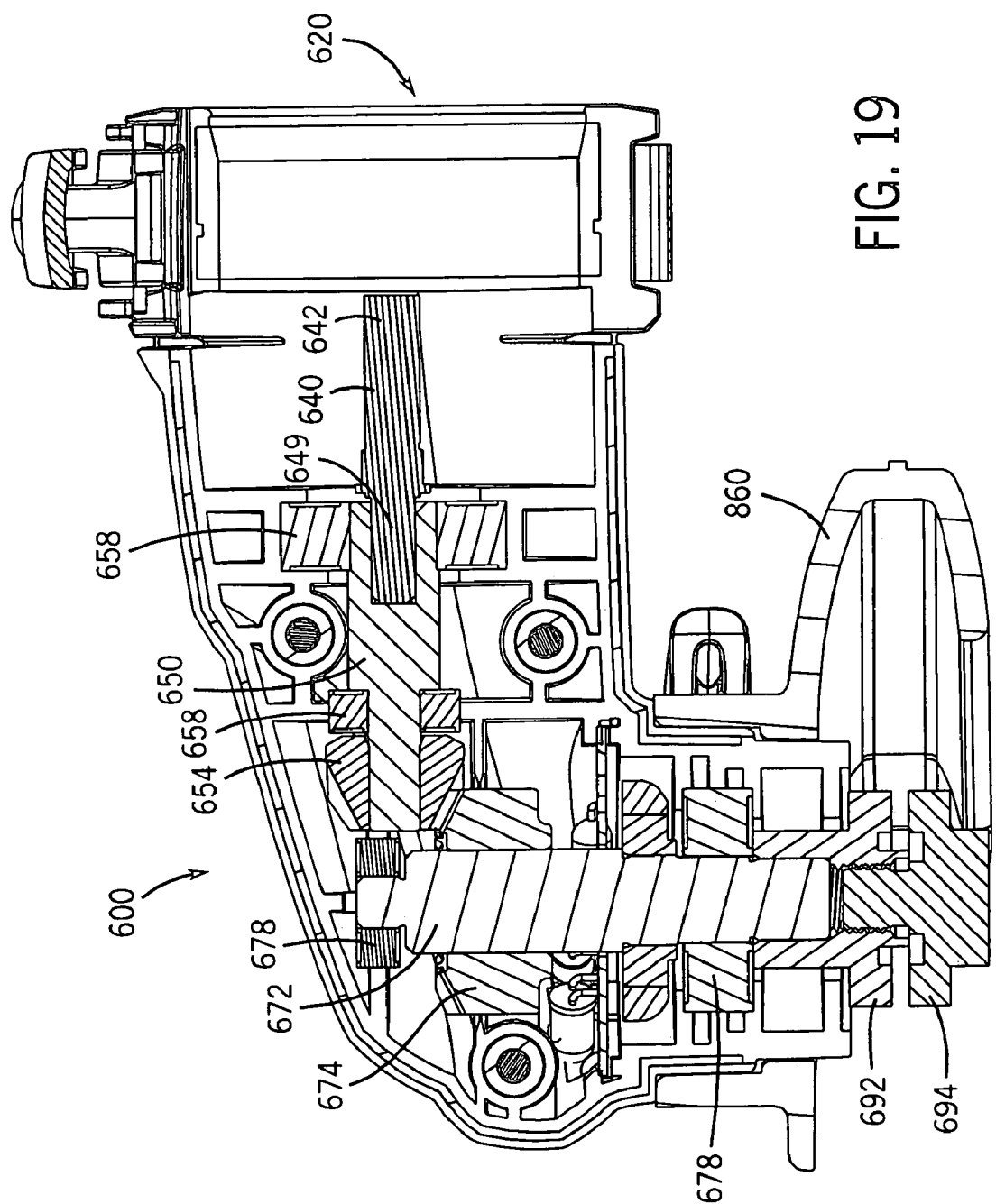
FIG. 19 is a cross-sectional view of an attachment or accessory for a power tool according to another exemplary embodiment.
Figure 20:
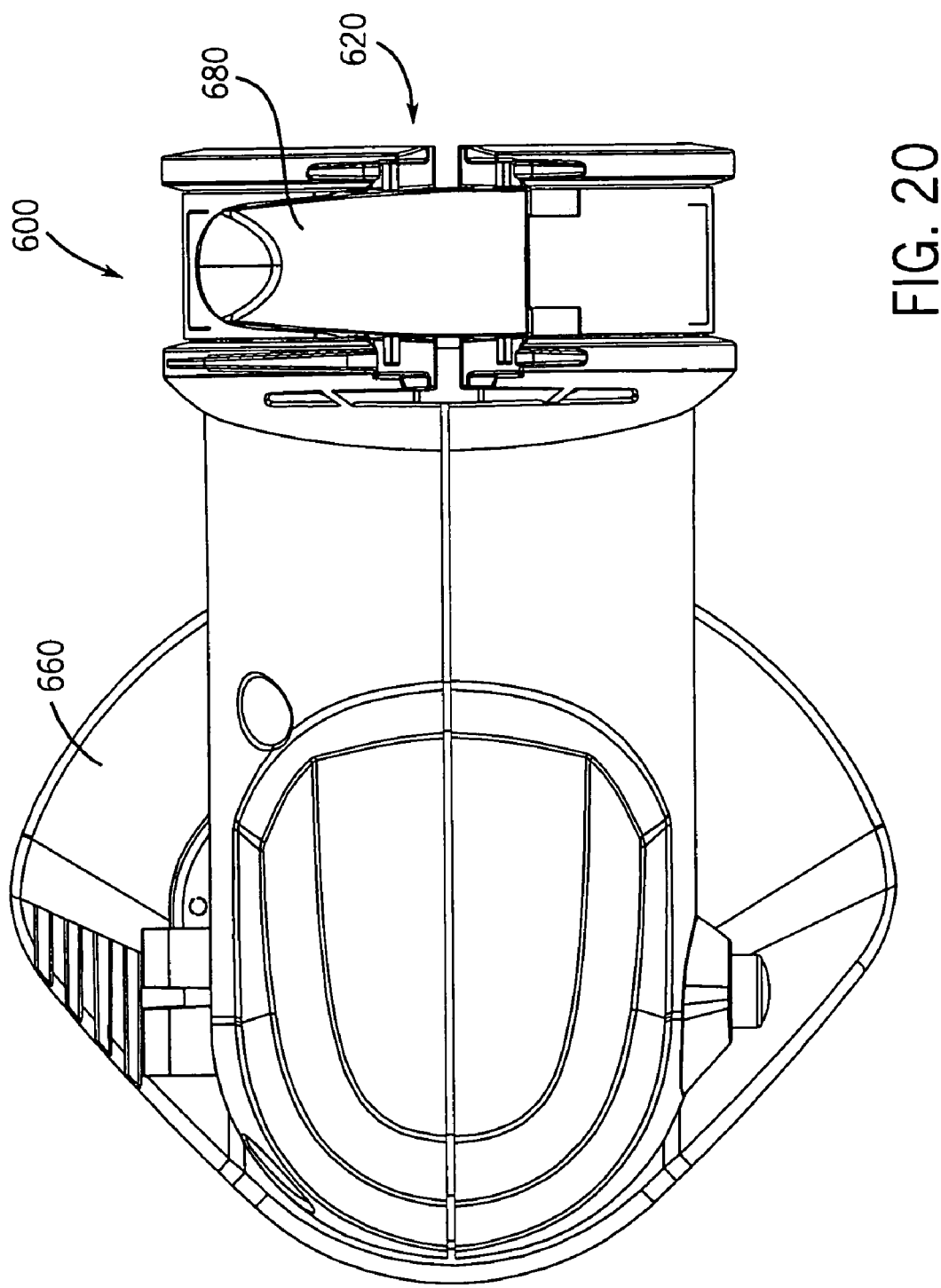
FIG. 20 is a top plan view of the attachment shown in FIG. 19.
Figure 21:
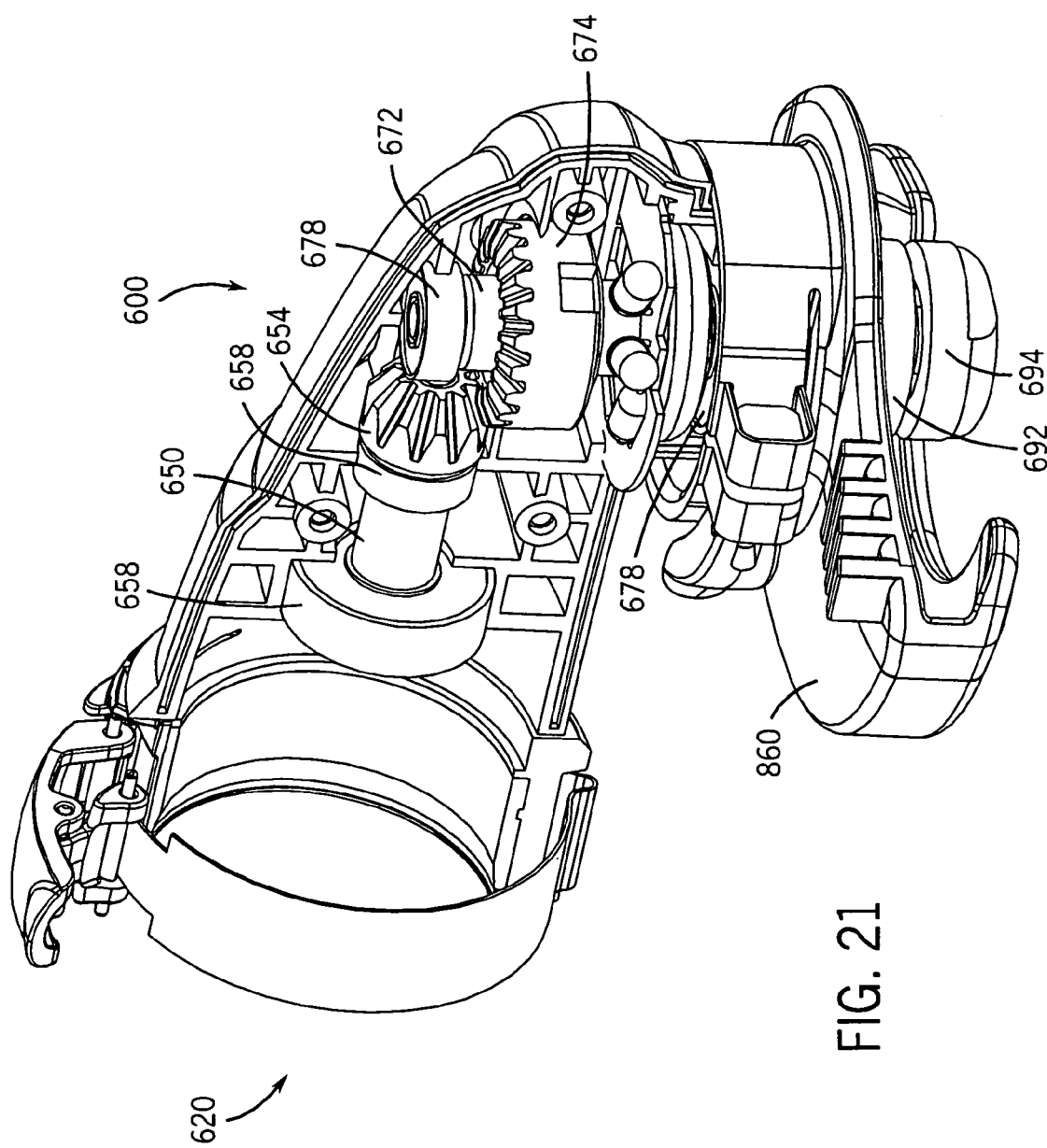
FIG. 21 is a perspective cutaway view of the attachment shown in FIG. 19.

According to an exemplary embodiment, the head portion 149 includes a relatively square-shaped aperture or broach 144 formed therein. According to other exemplary embodiments, the aperture may have other shapes and/or sizes. The aperture 144 is configured to receive therein drive shafts of various devices (see, e.g., FIG. 18, in which the male connector 140 is shown in exploded perspective view showing the coupling of the male connector 140 to a flexible shaft cutting tool 500; a drive shaft (not shown) of the flexible shaft cutting tool 500 is received within the aperture 144). The aperture 144 may include features 145 (e.g., cutouts, recesses, depressions, extensions, protrusions, etc.) that assist in providing relatively secure coupling the male connector 140 to such a drive shaft.

A front surface 146 of the male connector 140 is arranged such that the plane of the front surface 146 is substantially perpendicular to the central longitudinal axis 141 (FIG. 10) of the male connector 140. A curved or chamfered portion 148 (FIG. 11) extends from the front surface to the aperture 144 to provide a relatively smooth transition from the front surface to the aperture 144. One advantageous feature of such a configuration is that coupling of an external drive shaft with the aperture 144 may be accomplished without a precise alignment between the aperture 144 and the drive shaft (e.g., the transition provided by curved portion 148 acts as a cam and allows the drive shaft to "slide" into the aperture 144 if a slight misalignment exists when the aperture 144 and drive shaft are brought together).

Figure 10:
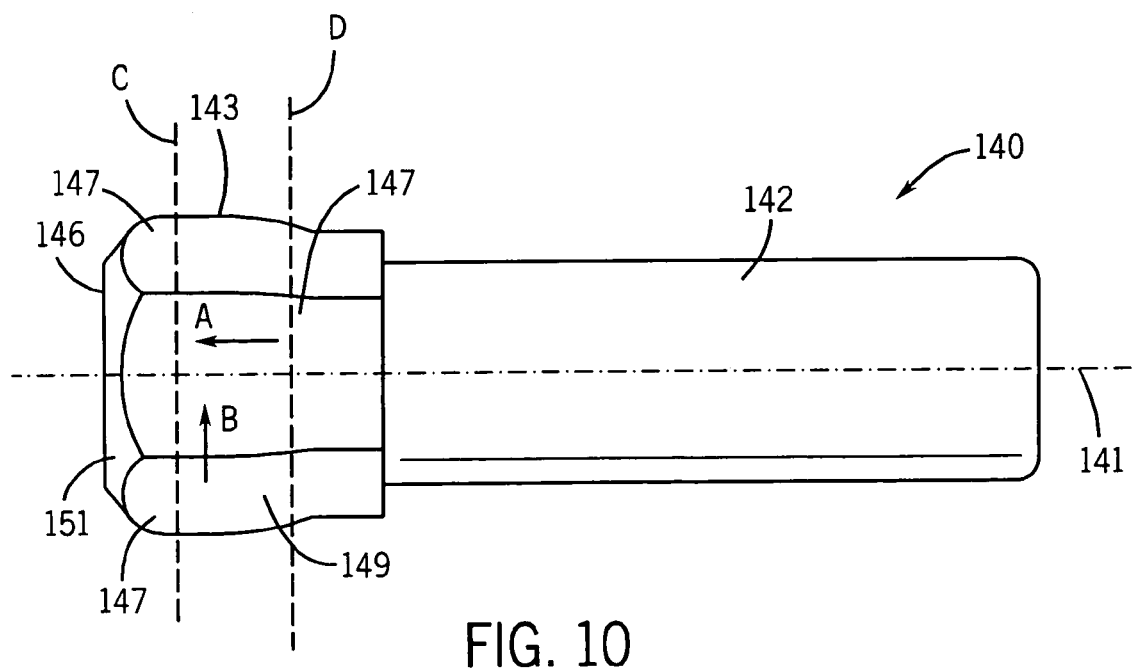
FIG. 10 is a side view of another connector for use with the attachment shown in FIG. 1 according to an exemplary embodiment.

The shape of the male connector 140 provides for relatively simple and secure coupling of the male connector 140 to the female connector 156. As shown in FIGS. 10 and 12, the six surfaces 147 that form the outer surface of the head portion 149 have a curved or crowned shape (i.e., the surfaces 147 are convex with respect to the central longitudinal axis 141 in the direction shown by arrow A, with point 143 representing the point at which the surfaces 147 reach their greatest distance from the central longitudinal axis 141). The surfaces 147 are generally flat or planar moving in the direction shown by arrow B perpendicular to the central longitudinal axis 141 (see, e.g., FIG. 11, in which the outermost point 143 of the surfaces 147 are generally flat or planar when viewed in the direction of the central longitudinal axis 141).

Figure 11:
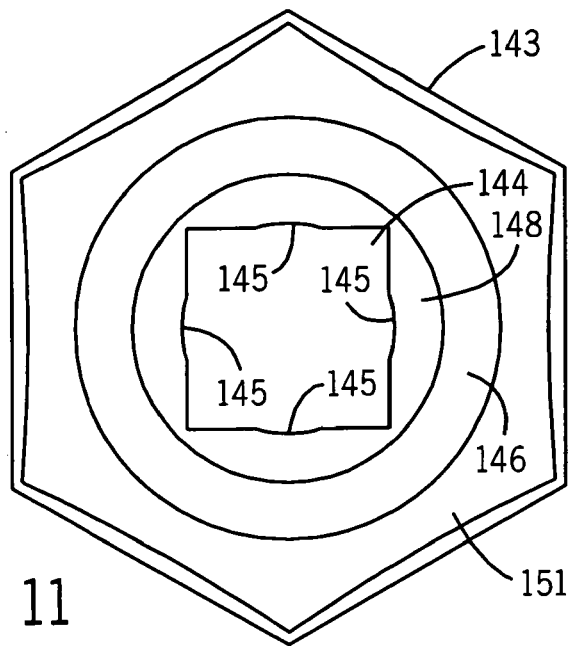
FIG. 11 is an end view of the connector shown in FIG. 10.
Figure 12:
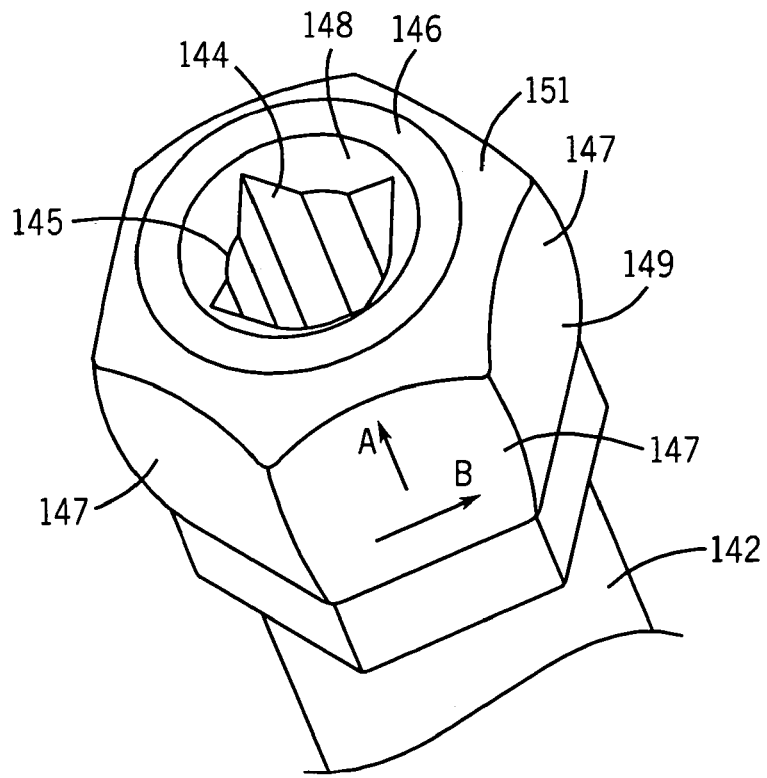
FIG. 12 is a perspective view of a portion of the connector shown in FIG. 10.

Head portion 149 has a generally hexagonal exterior shape when taken in cross-section perpendicular to the central longitudinal axis 141 (see, e.g., FIG. 11). Because the surfaces 147 have a convex shape in the longitudinal direction, the size of the hexagonal cross-section varies along the length of the head portion 149. For example, a hexagonal cross-section taken at dotted line "C" in FIG. 10 will have a larger area than that of a cross-section at dotted line "D." Stated another way, the length of a line extending between the central longitudinal axis 141 normal to the sides of the hexagon varies along the length of the head portion 149. As shown in FIG. 11, outermost point 143 of head portion 149 represents the point of maximum length of a line between the central longitudinal axis 141 normal to the surfaces 147.

The crowned or curved shape of the head portion 149 enables relatively simple coupling of the head portion 149 to the female connector 156. For example, the head portion 149 may be inserted into the aperture 160 of the female connector 156 in a manner that allows slight misalignment between the aperture 160 and the head portion 149. The head portion 149 also includes a tapered or chamfered (e.g., curved) portion 151 between the front surface 146 and the external surfaces 147 of the head portion. The shape of the head portion (e.g., the crowned surfaces 147 and the tapered or chamfered portion 151) acts as a cam to align the head portion 149 in the aperture 160 to ensure a relatively secure fit between the head portion 149 and the aperture 160 in the female connector 156. When assembled, the outermost point 143 of the head portion engages the interior of the female connector 156.

While the preferred embodiment includes a male connector 140 having six crowned or convex surfaces 147, according to other exemplary embodiments, a different number of crowned surfaces may be provided. For example, a male connector may be provided having three, four, five, twelve, or a different number of crowned surfaces, such that the cross-section of the head portion perpendicular to the central longitudinal axis has a shape corresponding to a different type of polygon (e.g., a triangle, square, pentagon, dodecahedron, etc.). According to other alternative embodiments, the male connector may have a non-polygonal shape (e.g., a six-sided star, etc.) that includes crowned surfaces or features (e.g., the points of the star may be crowned).

The male connector 140 may be coupled to any of a variety of attachments for a power tool (e.g., a rotary cutting or cutout tool, etc.). For example, once the male connector 140 is coupled to the power tool 200 (e.g., in a chuck or collet assembly), various attachments may be coupled to the power tool having drive mechanisms that engage the male connector. For example, an angle attachment may be used with the power tool in a first configuration and a flexible shaft cutting tool attachment (see, e.g., FIG. 18) may be used with the power tool in a second configuration. Any of a variety of additional attachments may also be used which have drive shafts or other mechanisms that may be engaged with the male connector. In this manner, the male connector provides for relatively simple and quick attachment and detachment of various attachments to the power tool to provide additional and convenient functionality for the power tool.

Figure 6:
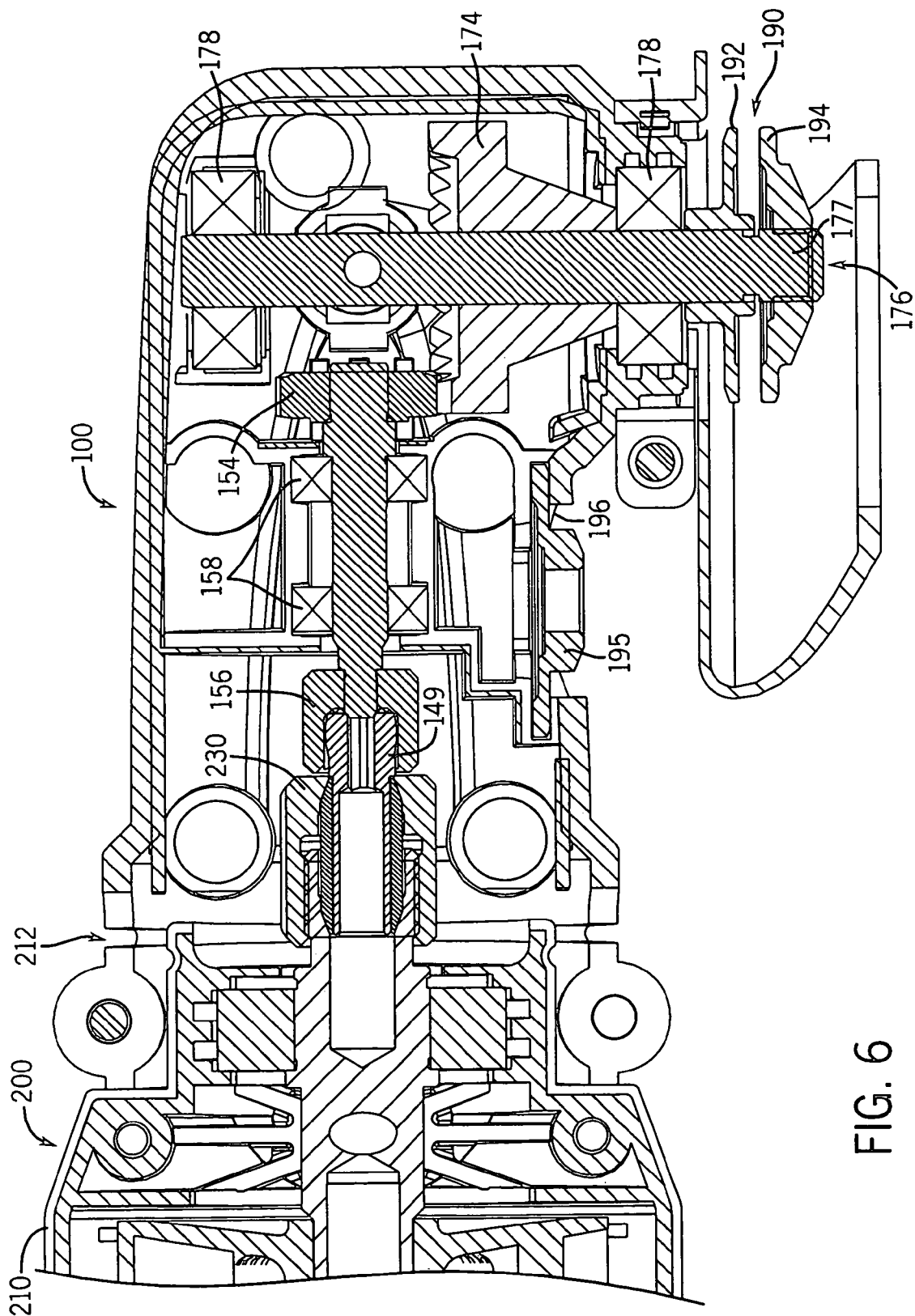
FIG. 6 is a cross-sectional view showing a portion of the assembly shown in FIG. 5 in which the attachment is coupled to the power tool.
Figure 7:
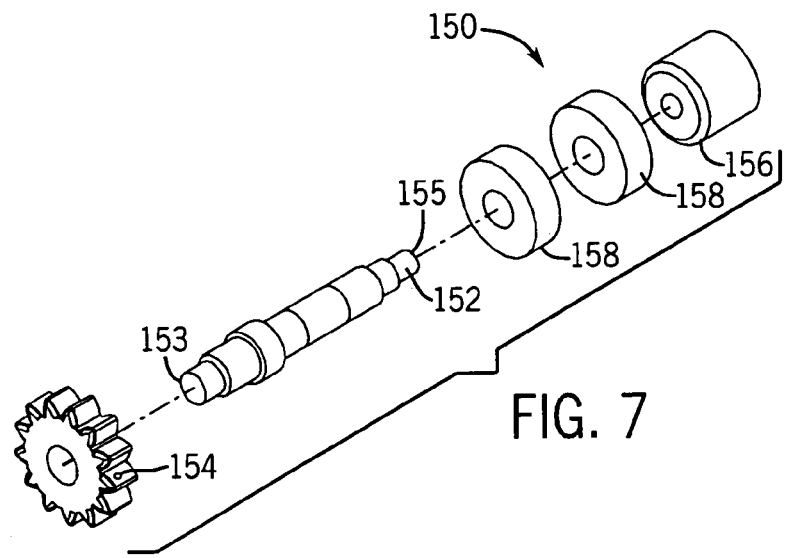
FIG. 7 is an exploded perspective view of a gear and bearing assembly used in the attachment shown in FIG. 1.

As seen in FIGS. 2, 4, and 6, a second gear and bearing assembly 170 is also provided within the attachment housing 110, and the assembly 170 includes a shaft 172 (e.g., an attachment shaft) having a gear 174 (shown as a crown or ring gear) coupled thereto for engaging the gear 154 provided on the tool coupling shaft 152. Each of the gears 154 and 174 may be coupled to the shafts 152, 172, respectively, using any conventional method, and may be made of a relatively strong and wear resistant material (e.g., steel).

The shafts 152 and 172 are provided in the attachment housing 110 such that the end 155 of the tool coupling shaft 152 extends toward the open first end 120 of the attachment housing 110 along an axis thereof. The attachment shaft 172 includes an attachment end 176 that extends from a second end 130 of the attachment housing 110.

According to an exemplary embodiment, the attachment shaft 172 is mounted at a right angle to the tool coupling shaft 152 (e.g., the central longitudinal axis of the attachment shaft 172 is arranged at a right angle to the central longitudinal axis of the tool coupling shaft 152). According to other exemplary embodiments, the attachment shaft 172 may be provided at other angles with respect to the tool coupling shaft 152 (e.g., any angle such that the central longitudinal axes of the shafts are not collinear or parallel).

According to an exemplary embodiment, the gear 154 mounted on the tool coupling shaft 152 engages and meshes with the gear 174 provided on the attachment shaft 172. In this manner, rotation of the tool coupling shaft 152 is translated to rotation of the attachment shaft 172 via the gears 154 and 174. Accessories coupled to the attachment shaft 172 at the attachment end 176 (e.g., cutting wheels, sanding disks, etc.) are thereby rotated when the tool coupling shaft 152 is rotated. When the attachment 100 is coupled to the power tool 200, the motor shaft 214 of the power tool is coupled to the tool coupling shaft 152 of the attachment 100 (e.g., by coupling male connector 140 to female connector 156 in the manner described above). When the motor of the power tool 200 is activated to rotate the motor shaft 214, the rotation is conveyed to the tool coupling shaft 152 and translated to the attachment shaft 172 via the intermeshing of the gears 154 and 174.

According to an exemplary embodiment, both the tool coupling shaft 152 and the attachment shaft 172 are relatively permanently mounted in the attachment housing 110 (e.g., neither of the shafts are removed from the attachment housing 110 during coupling or decoupling of the attachment to the power tool). Because the shafts 152 and 172 remain within the attachment housing 110, the gears 154 and 174 remain engaged and intermeshed. This in turn reduces the opportunity for misalignment of the gears, which may result in undue wear or damage to the gears during use of the attachment.

The attachment shaft 172 is preferably mounted for rotational movement in the attachment housing 110. According to an exemplary embodiment, a bearing 178 is coupled to the attachment shaft 172 and fixedly mounted in the attachment housing 110. According to an exemplary embodiment, two bearings 178 are employed, with one bearing positioned along the attachment shaft 172 on each side of the gear 174. The bearings 178 may be implemented in a conventional manner (e.g., as ball bearing assemblies, etc.).

The attachment 100 may be employed in combination with various accessories which are attached to the end 176 of the attachment shaft 172. A mounting assembly 190 (FIGS. 4 and 6) is preferably formed at the end 176 of the attachment shaft 172 to provide a means for attaching various accessories thereto. For example, an attachment flange 192 may be fixedly mounted on the end 176 of the attachment shaft 172. A portion 177 of the end 176 of the attachment shaft 172 extends beyond the attachment flange 192. According to an exemplary embodiment, the portion 177 is at least partially threaded.

An accessory (e.g., a cutting wheel, sanding disk, etc.) may be attached to the attachment shaft 172 by placing the cutting wheel or other accessory against the mounting flange 192 with the threaded portion 177 extending through a central aperture formed in the cutting wheel. A flange nut 194 may then be threaded to the threaded portion 177 and tightened against the cutting wheel, thereby relatively securely attaching the cutting wheel to the attachment shaft 172. The cutting wheel may be removed from the attachment shaft 172 by loosening the flange nut 194, removing the flange nut 194 from the threaded portion 177 of the attachment shaft 172, and then removing the cutting wheel from the end of the attachment shaft 172. As shown in FIG. 6, a flange nut 195 may be stored in the attachment 100 using a slot 196 formed therein. Other on-board storage mechanisms (e.g., chambers, compartments, etc.) may also be provided in the attachment.

According to another exemplary embodiment, the attachment 100 may be employed for sanding operations by attaching a sanding disk back-up pad to the end 176 of the attachment shaft 172. The back-up pad may include a bottom surface to which sanding disks may be attached (e.g., using an adhesive, hook-and-loop connector, etc.). The back-up pad preferably includes a mounting structure positioned centrally thereon (e.g., a threaded central aperture). The back-up pad mounting structure preferably includes a hex nut or similar configuration which facilitates tightening the back-up pad attachment onto the attachment shaft 172 using a wrench or other similar tool.

According to a preferred embodiment, means are provided for temporarily preventing rotation of the attachment shaft 172 to facilitate the attachment of accessories thereto, and the removal of attachments therefrom. As seen in FIG. 2, when the attachment 100 is attached to the power tool 200, rotation of the attachment shaft 172 may be prevented by actuating a locking mechanism 250 (e.g., a shaft lock mechanism). Locking mechanism 250 includes a button or pin 256 and a leaf spring 254 having a rib or extension 255 formed thereon. Button 256 extends through an aperture or opening 252 formed in the attachment housing 110. When button 256 is depressed by a user, the rib 255 engages an aperture or hole 175 provided in the attachment shaft 172 to prevent rotation of the attachment shaft. Various other mechanisms for preventing rotation of the attachment shaft 172 may be utilized according to other exemplary embodiments.

A guard or shield 260 is provided on the attachment 100. The guard 260 may be implemented in a conventional manner, and is attached to the attachment 100 at the second end 130 of the attachment housing 110 where the attachment shaft 172 emerges from the attachment housing 110. The guard surrounds or encloses at least a portion of an accessory that is coupled to the attachment shaft 172. The guard 260 may be made of a variety of materials. For example, the guard may be made of a metal, plastic, composite, or other material. According to a preferred embodiment, the guard is made of metal (e.g., steel). According to another exemplary embodiment, the guard is made of the same material as the rest of the attachment (e.g., hard plastic), and may be integrally formed therewith or formed separately and coupled to the attachment.

An adjustable foot 262 is coupled to the guard 260. The foot 262 includes a slot 264 formed therein. A cutting wheel or other accessory, when mounted on the attachment 100, extends through the slot 264. A leading edge 266 of the foot 264 may be curved backward slightly. The foot 262 may be attached to the guard 260 by a screw 268 or other fastener which allows the position of the foot 262 to be adjusted. The foot 262 may thus be positioned such that the depth of a cut made by a cutting wheel or other accessory may be adjusted when a cut is made by placing a face 270 of the foot 262 along an edge of a workpiece being cut.

The attachment 100 may be attached to a power tool 200 (e.g., a rotary cutting or cutout tool) and employed for a cutting or sanding operation in the following manner. The male connector 140 is inserted into a conventional collet or drill chuck provided on the power tool 200 and secured in place (e.g., by tightening a collet nut or drill chuck about the shaft 142 of the male connector 140). The head portion 149 of the male connector 140 extends out of the collet or drill chuck for engagement with the female connector 156 provided on the tool coupling shaft 152.

The end 212 of the power tool housing 210 is inserted into the open end 120 of the attachment housing 110. Fasteners 124 are used to securely fasten the attachment 100 to the power tool 200 in a fixed relationship. In this manner, movement of the attachment 100 relative to the power tool 200 is prevented during operation.

Upon insertion of the end of the end 212 of the power tool 200 into the open end 120 attachment 100, the head portion 149 of the male connector 140 mates with the aperture 160 provided in the female connector 156. Coupling of the male and female connectors allows rotation of the motor shaft 214 of the power tool 200 to correspondingly rotate the female connector 156, tool coupling shaft 152, and attachment shaft 172 (e.g., through the interaction of the gears 154 and 174). Advantageously, the size and shape of the male and female connectors allows for a slight misalignment of the components upon coupling. Such misalignment is corrected as the male connector is further inserted into the female connector, such that a relatively secure alignment is maintained when the attachment 100 is coupled to the power tool 200. Another advantageous feature of using a crowned shape for the male connector is that misalignments resulting from the assembly of the attachment 100 may be compensated for. For example, if the central longitudinal axis of the tool coupling shaft 152 is not precisely collinear with the central longitudinal axis of a motor shaft of a rotary power tool to which the attachment 100 is coupled, the crowned shape still allows the male connector to engage the female connector in a manner that will allow use of the attachment 100.

During coupling of the attachment 100 to the power tool 200, a locking mechanism 250 may be employed to prevent rotation or movement of the shafts 152 and 172. A shaft lock pin 234 provided on the power tool 200 may also be utilized to prevent rotation of the motor shaft 214 of the power tool 200. When depressed, the shaft lock pin 234 engages the motor shaft 214 to prevent rotation of the shaft. The shaft lock pin 234 may be used when coupling the attachment 100 to the power tool 200 and/or to tighten various accessories (e.g., a cutting tool bit, a male connector, etc.) within a drill chuck or collet assembly coupled to the motor shaft 214.

While the exemplary embodiments have been described with respect to a male connector being coupled to a motor shaft of a power tool and a female connector provided within the attachment to receive the male connector, according to an alternative embodiment shown in FIGS. 13–17, the positions of the male and female connectors may be reversed. FIG. 13 shows an attachment 400 having a housing 410 similar to that shown in FIG. 1.

Figure 15:
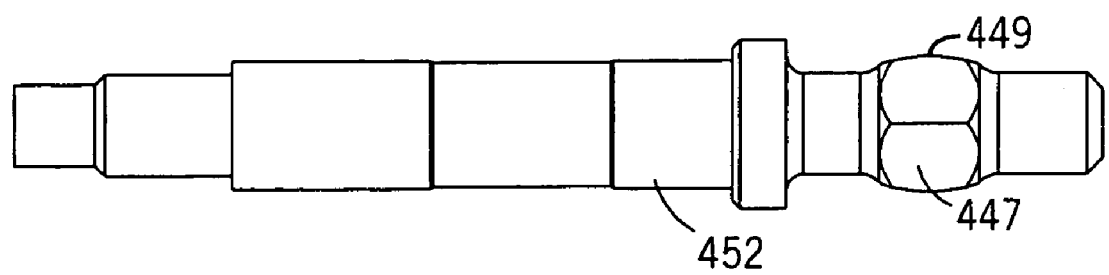
FIG. 15 is a side plan view of the gear and bearing assembly shown in FIG. 14.

A male connector 449 (e.g., having a plurality of surfaces 447 and a crowned outer surface shown in FIG. 15) is coupled to a tool coupling shaft 452 provided in the attachment housing 410. A female connector 456 is coupled to a motor shaft 414 of a power tool 450. The female connector 456 includes an opening or aperture 460 for receiving the male connector 449 therein. The opening 460 has a size and shape configured for coupling with the male connector 449. As shown in the FIGURES, the opening 460 is provided as a 12-point opening for use with the six-sided male connector 449. The use of the 12-point opening allows for relatively simple coupling of the male connector 449 with the female connector 456.

Connecting the attachment 400 to the power tool 450 is accomplished in a similar manner as that described above, taking into account the reversal of the male and female connectors. The female connector 456 is coupled to the motor shaft 414 and secured thereto. The end 412 of the power tool housing 451 is inserted into the open end 420 of the attachment housing 410. As the power tool 450 and attachment 400 are brought together, the male connector 449 is received within the female connector 456. The crowned shape of the male connector 449 (e.g., convex shape that curves outward and away from the central longitudinal axis of the tool coupling shaft 452) provides for relatively simple coupling to the female connector 456 in a manner similar to that described above with respect to the preferred embodiment.

FIGS. 19-25 illustrate features of an attachment or accessory 600 similar the attachment 100 described above. The attachment 600 includes a gear and bearing assembly including a shaft 672 (an attachment shaft) having bearings 678 and a gear 674 coupled thereto. Also attached to the attachment shaft 672 is an attachment flange 692 and a flange nut 694. The attachment 600 also includes a gear and bearing assembly 650 that includes a gear 654 and bearings 658 coupled to a shaft 652 (a tool coupling shaft). The attachment 600 is adaptable for coupling to a power tool at an open end 620 of the attachment 600. A latching assembly 680 is used with the attachment 600 in place of the extensions 126, 128 and fastener 124 shown and described with respect to FIG. 1. The attachment 600 also includes a guard 860 similar to guard 260 shown in FIG. 1.

It should be noted that gears 654 and 674 have a different configuration than gears 154 and 174 shown in FIG. 2, for example. According to various exemplary embodiments, the gears utilized in either the attachment 100 or the attachment 600 may be pinion gears, planetary or bevel gears, crown gears, and any combination of these or other gears that may be suitable for a particular application). It should also be noted that the various gears shown in the exemplary embodiments may be substituted for one another (e.g., the gears shown with respect to the attachment 600 may be used with the attachment 100, and vice versa).

As shown in FIGS. 19–25, the gear and bearing assembly 650 does not utilize a female connector such as the female connector 156 shown, for example, in FIG. 8. Instead of having a female connector coupled to the shaft 652, the shaft 652 itself has an aperture or opening 660 provided therein for receiving a male connector that may be coupled to a motor shaft of a power tool. As shown in FIG. 24, the aperture 660 has a relatively square cross-section.

FIG. 25 shows a perspective view of a connector 640 shown as a male connector. Male connector 640 includes a shaft 642 and a head portion 649 having a plurality of surfaces 647. A curved portion 651 extends between the surfaces 647 and a front portion 646 of the head portion 649. A chamfered or rounded transition is also provided between the adjacent surfaces 647. According to an exemplary embodiment, the head portion 649 includes four surfaces 647. According to other exemplary embodiments, a different number of surfaces may be provided (e.g., 5, 6, 8, 9, 12, etc.).

Unlike the male connector 140 shown and described previously, the surfaces 647 of the male connector 640 do not have a crowned or curved configuration, and instead are relatively flat or planar in the direction of the central longitudinal axis of the shaft 642. That is, the surfaces 647 do not bow outward from a central longitudinal axis of the male connector 640.

The head portion 649 is inserted into the aperture 660 provided in the tool coupling shaft 652 of the attachment 600. In use, the shaft 642 of the male connector 640 is received within a chuck or collet assembly of a power tool, after which it is inserted into the aperture 660 of the tool coupling shaft 652 when the attachment 600 is coupled to the power tool at the open end 620 of the attachment 600.

One advantageous feature of providing an aperture in the tool attachment shaft is that the need to provide an additional component such as the female connector 152 is eliminated.

It should also be noted that while certain configurations of various components of the embodiment shown in FIGS. 19–25 differ from that of the exemplary embodiment shown and described as attachment 100, various substitutions may be made between the components used in each of the exemplary embodiments. It should also be noted that while certain components of the attachment 600 differ from those of the attachment 100, the gear and bearing assembly 650 provided for coupling to the motor shaft of a power tool still is provided such that it remains within the attachment 600 due to interaction of the bearings 658 with features provided in the interior of the attachment 600. In this manner, the engagement between the gears 654 and 674 is retained such that the opportunity for misalignment between the gears is reduced.

As will be apparent to one of skill in the art reviewing this disclosure, an angle attachment utilizing features of the various exemplary embodiments described herein may have a variety of advantageous features. For example, the attachment may provide additional functionality for a rotary power tool such as a rotary cutting or cutout tool (e.g., the attachment may be used in conjunction with sanding or grinding disks, cutting wheels, polishing pads, and similar accessories). Further, such an attachment may be coupled to and removed from a rotary power tool in a relatively simple and efficient manner.

Another advantageous feature is that such an attachment may be coupled to a rotary power tool using connectors that allow for slight misalignment when the connectors are brought together. In one embodiment, the connector for use with a rotary power tool includes a crowned or convex head portion configured to mate with a female connector having a polygonal (e.g., pentagon, hexagon, dodecahedron) aperture formed therein. Such a connector may be utilized with an angle attachment and/or any of a variety of other attachments for a power tool (e.g., flexible shaft attachments, etc.). The connector may be attached to a power tool and selectively coupled and decoupled from various attachments without having to be removed from the power tool.

Another advantageous feature is that such an attachment may include gear and bearing assemblies that are relatively permanently provided within the attachment housing (e.g., the gear and bearing assemblies are not removed from the housing to couple the attachment to power tools), such that the alignment of the various gears are maintained during coupling of the attachment to a power tool.

As one of skill in the art will understand from reviewing this disclosure, other advantageous features may be obtained in addition to those described herein, and the recitation of such advantageous features herein is not intended to be limiting on the scope of the invention as recited in the appended claims.

The construction and arrangement of the elements of the attachment as shown in the preferred and other exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the system may be constructed from any of a wide variety of materials that provide sufficient strength or durability, including any of a wide variety of moldable plastic materials in any of a wide variety of colors, textures and combinations. The order or sequence of any process or method steps may be varied or re-sequenced according to alternative embodiments. Other substitutions, modifications, changes and omissions may be made in the design; operating conditions and arrangement of the preferred and other exemplary embodiments without departing from the scope of the present invention.

What is claimed is:

1. An angle attachment for a rotary power tool comprising:
   a first assembly including a first shaft and a first gear, the first shaft having a central longitudinal axis;
   a second assembly including a second shaft and a second gear, wherein the second gear engages the first gear and the second shaft has a central longitudinal axis, wherein the central longitudinal axis of the second shaft is not collinear or parallel to the central longitudinal axis of the first shaft; and
   a male connector configured for removable coupling to a motor shaft of a rotary power tool and for removable coupling with the first assembly;
   wherein at least a portion of the male connector is configured for insertion into an aperture provided in the first shaft or an aperture provided in a female connector coupled to the first shaft.

2. The angle attachment of claim 1, wherein the first assembly is retained within the angle attachment such that the angle attachment may be coupled to the rotary power tool without removal of the first assembly from the angle attachment.

3. The angle attachment of claim 1, wherein the aperture comprises a polygonal aperture for receiving at least a portion of the male connector.

4. The angle attachment of claim 3, wherein the male connector is received in a female connector coupled to the first shaft.

5. The angle attachment of claim 3, wherein the male connector is received in an aperture provided in an end of the first shaft.

6. The angle attachment of claim 1, wherein the male connector includes a central longitudinal axis and a head portion having a plurality of surfaces.

7. The angle attachment of claim 6, wherein the head portion has a polygonal cross-sectional shape transverse to the central longitudinal axis of the male connector.

8. The angle attachment of claim 7, wherein at least one of the plurality of surfaces is convex with respect to the central longitudinal axis of the male connector.

9. The angle attachment of claim 8, wherein a plurality of the surfaces are convex with respect to the central longitudinal axis of the male connector.

10. The angle attachment of claim 8, wherein the head portion includes six surfaces and the head portion has a generally hexagonal cross-sectional shape transverse to the central longitudinal axis of the male connector.

11. The angle attachment of claim 6, wherein the head portion includes four relatively planar surfaces such that the cross-section of the head portion transverse to the longitudinal axis of the male connector is substantially square.

12. The angle attachment of claim 11, further comprising at least one of a curved portion and a chamfered portion provided intermediate each of the four planar surfaces.

13. The angle attachment of claim 1, wherein the male connector has an aperture formed therein for engaging a drive shaft of an attachment for a power tool.

14. The angle attachment of claim 13, wherein the aperture is configured for engaging a drive shaft of a flexible shaft cutting tool attachment for a power tool.

15. The angle attachment of claim 1, wherein at least one of the first gear and the second gear is a pinion gear and the other of the first gear and the second gear is a crown gear.

16. The angle attachment of claim 1, wherein at least one of the first gear and the second gear is a bevel gear.

17. An attachment for a rotary power tool comprising:
a first assembly comprising a first gear coupled to a first shaft; and
a second assembly comprising a second gear coupled to a second shaft, the second gear intermeshing with the first gear;
wherein a component of the first assembly includes an aperture for receiving therein at least a portion of a connector configured for removable coupling between a motor shaft of a rotary power tool and the component;
wherein the attachment is configured to translate rotation of the first shaft to rotation of the second shaft, the first and second shafts each having axes of rotation and oriented such that the axis of rotation of the first shaft is neither parallel nor collinear with the axis of rotation of the second shaft.

18. The attachment of claim 17, wherein the first assembly is retained within the attachment such that the angle attachment may be coupled to the rotary power tool without removal of the first assembly from the angle attachment.

19. The attachment of claim 17, wherein the component including an aperture comprises a connector coupled to the first shaft.

20. The attachment of claim 17, wherein the component including an aperture is the first shaft and the aperture is provided in an end portion of the first shaft.

21. The attachment of claim 17, wherein the connector includes a central longitudinal axis and a head portion having a plurality of surfaces.

22. The attachment of claim 21, wherein the head portion has a polygonal cross-sectional shape transverse to the central longitudinal axis of the member.

23. The attachment of claim 22, wherein a plurality of the plurality of surfaces are convex with respect to the central longitudinal axis of the connector.

24. The attachment of claim 22, wherein the head portion includes four relatively planar surfaces such that the cross-section of the head portion transverse to the longitudinal axis of the member is substantially square.

25. An angle attachment for a rotary power tool comprising:
a first assembly comprising a first gear provided on a first shaft;
a second assembly comprising a second gear intermeshing with the first gear and provided on a second shaft, the first shaft and second shaft arranged such that they are not parallel or collinear with each other; and
a member for removable coupling to the first assembly and to a drive shaft of a rotary power tool;
wherein the first shaft includes an aperture for receiving therein a portion of the member;
whereby rotation of the drive shaft of the rotary power tool may be communicated to the first assembly and to the second assembly by coupling the member to the drive shaft and to the first assembly.

26. The attachment of claim 25, wherein the first assembly is retained within the angle attachment such that the angle attachment may be coupled to the rotary power tool without removal of the first assembly from the angle attachment.

27. The angle attachment of claim 25, wherein the aperture is provided in an end portion of the first shaft.

28. The angle attachment of claim 25, wherein the connector includes a central longitudinal axis and a head portion having a plurality of surfaces.

29. The angle attachment of claim 28, wherein the head portion has a polygonal cross-sectional shape transverse to the central longitudinal axis of the member.

30. The angle attachment of claim 29, wherein at least one of the plurality of surfaces are convex with respect to the central longitudinal axis of the connector.

31. The angle attachment of claim 29, wherein the head portion includes four relatively planar surfaces such that the cross-section of the head portion transverse to the longitudinal axis of the member is substantially square.

32. A connector for coupling a rotary power tool to an attachment for the rotary power tool, the connector comprising:
a shaft having a central longitudinal axis, the shaft configured for coupling to a drive shaft of a rotary power tool; and
a head portion having a plurality of surfaces, at least a portion of the head portion having a generally polygonal cross-section transverse to the central longitudinal axis, at least one of the plurality of surfaces being convex with respect to the central longitudinal axis in the direction of the central longitudinal axis;
wherein the head portion is configured for engaging a polygonal aperture provided in a component coupled to a rotary member of the attachment;
whereby rotation of the drive shaft of the rotary power tool may be transmitted to the rotary member of the attachment utilizing the connector.

33. The connector of claim 32, wherein the portion of the head portion has a generally hexagonal cross-section transverse to the central longitudinal axis.

34. The connector of claim 32, wherein a plurality of the surfaces of the head portion are convex with respect to the central longitudinal axis in the direction of the central longitudinal axis.

35. The connector of claim 32, wherein the connector includes an aperture formed therethrough for engaging a drive shaft of an attachment for a rotary power tool.

36. The connector of claim 35, wherein the aperture provided in the connector has a generally polygonal shape.

37. The connector of claim 36, wherein the aperture includes a plurality of sides and at least one of the plurality of sides includes a cutout for engaging a feature provided on the drive shaft.

* * * * *